United States Patent [19]

Hirai

[11] Patent Number: 4,899,337
[45] Date of Patent: Feb. 6, 1990

[54] TIME DIVISION MULTIPLEXER WITH AUTOMATIC CALL FUNCTION

[75] Inventor: Masato Hirai, Hadano, Japan

[73] Assignee: Hitachi, Ltd., Tokyo, Japan

[21] Appl. No.: 230,063

[22] Filed: Aug. 9, 1988

[30] Foreign Application Priority Data

Aug. 17, 1987 [JP] Japan ................. 62-203011

[51] Int. Cl.$^4$ ............................................. H04J 3/17
[52] U.S. Cl. ......................................... 370/80; 370/84
[58] Field of Search ............................ 370/58, 84, 80; 379/113, 34

[56] References Cited

U.S. PATENT DOCUMENTS 4,477,898 10/1984 Cholat-Namy ................. 370/80
4,528,660 7/1985 Gentry ............................. 370/80
4,768,188 8/1988 Barnhart et al. ................ 370/95

FOREIGN PATENT DOCUMENTS 59-110240 12/1982 Japan .

Primary Examiner—Herbert Goldstein
Assistant Examiner—Frank M. Scutch, III
Attorney, Agent, or Firm—Fay, Sharpe, Beall, Fagan, Minnich & McKee

[57] ABSTRACT

A multiplexer for trunking, over at least one high-speed trunk line on a multiplex basis under statistical time-division multiplexing control, transmission data on low-speed lines connected to a plurality of data terminal units, operates normally to transmit multiplexed data over leased high-speed trunk lines and, when a data buffer which temporarily stores data on the low-speed lines has its contents in excess of a certain level, operates by adding a public line as a high-speed trunking line to the leased high-speed trunk line for implementing the multiplexed data trunking.

10 Claims, 4 Drawing Sheets

TIME DIVISION MULTIPLEXER WITH AUTOMATIC CALL FUNCTION

BACKGROUND OF THE INVENTION

This invention relates to a multplexer, and more particularly to a statistical time-division multiplexer suitable for the case of using a public switching network in the high-speed trunk circuit.

There has been known a statistical time-division multiplexer (will be termed "STDM" hereinafter) in which a time-division multiplexer implementing the statistical time-division multiplexing function by the intelligent function is connected between a group of data terminal units and a transmission path (high-speed trunk line), as disclosed in JP-A-59-110240 for example. FIG. 1 shows a general system configuration of the conventional STDM. In FIG. 1, data terminal equipment DTE 1—n and DTE 1'—n' are a plurality of terminal units which send and receive data by way of STDMs 20. The communication takes place between corresponding units such as between DTEs 1 and 1', 2 and 2', and n and n'. The two STDMs 20 are connected by one (or more) high-speed trunk line 22, for which a leased line or high-speed digital line is used.

FIG. 2 shows the internal blocks of the STDM 20. In FIG. 2, data sent from each DTE through low-speed lines 21 are received by a low-speed line interface 12 and stored in a data buffer 13. A multiplexing unit 14 multiplexes the contents of the data buffer 13 into frames each formed of 1 to several bytes of data sent from each DTE, and sends them out by way of a high-speed trunk line interface 15. Data received over the high-speed trunk line 22 are demultiplexed into data for each DTE by the multiplexing unit 14, and delivered to each DTE by way of the data buffer 13 and low-speed line interface 12. Data within a frame are set in such an order that the originating DTEs of data may be identified respectively. Generally, data sent from a DTE is followed by a pause before sending the successive data caused by the communication protocol, resulting in an effectively lower data rate than the nominal transmission speed of the low-speed line, and on this account, by transferring data of one DTE while other sending DTE does not send data, the total transmission rate of all the low-speed lines 21 can be nominally higher than that of the high-speed trunk line 22.

As mentioned above, the STDM utilizes the pauses in data transmission of each DTE to send other data and total data rate of the low-speed lines can be higher than the high-speed trunk line. However, in actual systems the total amount of data per unit time from all DTEs exceeds the speed of high-speed trunk line in some situations. In such a case, if the average traffic quantity of low-speed line data is below the capacity of the high-speed line speed, communications between the sending and receiving DTEs take place normally, although the transmission delay will increase. However, if this situation lasts a long time, the data buffer will overflow, resulting in the loss of data and the block of communication between the sending and receiving DTEs.

Generally, the ratio of the total speed of low-speed lines to the speed of high-speed trunk line is determined in consideration of traffic congestion from low-speed lines, so that the data buffer overflow can be avoided at the time of maximum traffic.

Even for a system, in which traffic is intensive so as; to form high peaks in certain narrow time bands in a day but the average daily traffic is low, it is necessary to determine the number of high-speed trunk lines (speed) necessary to meet the peak traffic. Consequently, the nature of the higher total data rate of low-speed lines than the rate of the high-speed trunk line, which is an advantage of STDM, cannot fully be practiced, leaving the high-speed trunk lines to work in a lower duty cycle.

SUMMARY OF THE INVENTION

An object of this invention is to solve the prior art problem and provide a multiplexer which can fully utilize the advantage of STDM, i.e., the higher total data rate of low-speed lines than the rate of high-speed trunk line.

According to this invention, in transmitting data, sent from a plurality of data terminal units over low-speed lines, through multiplexing in the high-speed trunk line under statistical multiplexing control, the quantity of contents of the data buffer for storing data temporarily is monitored. If the buffer store has exceeded a certain level, the transmission capacity of the high-speed trunk circuit is increased by using a high-speed trunk line provided with a public switching network in addition to the ordinary leased high-speed trunk lines for the data transmission. In consequence, the leased trunk lines are used effectively, without installing the capacity necessary for handling the peak traffic. At the same time the data buffer is prevented from overflowing, whereby stable communications between DTEs are accomplished. The public line is called on for connection upon detecting the data buffer store is in excess of a certain level. The public line may be connected in specific time bands of the day when the data traffic congestion is anticipated. Alternatively, the public line may be connected under control of an external unit, e.g., a computer in connection with a terminal unit, which monitors the state of data transmission.

The following describes the case of connecting the public line when the quantity of data buffer has exceeded a certain level. When the total amount of data transferred in unit time over low-speed lines is in excess of the data rate of high-speed trunk lines, the amount of data introduced over the low-speed lines into the data buffer increases gradually, and the eventual overflow of data buffer is expected.

In the inventive STDM, when a data buffer quantity monitoring means has detected the excess of a certain level, it calls on the public switching network to increase the number of high-speed trunk lines so that the high-speed trunk circuit has a virtually increased transmission capacity, whereby the data buffer overflow is prevented and stable communications between DTEs are accomplished.

According to this invention, a multiplexer under statistical time-division multiplexing control is designed to connect the public line to the multiplexer in addition to the high-speed trunk lines as the multiplexed trunk means when the data buffer, which stores data sent from terminals over low-speed lines, has exceeded a certain storage level, thereby increasing the transmission capacity, whereby the data buffer is prevented from overflowing and the high-speed trunk lines are used more efficiently, while making use of the advantage of the statistical time-division multiplexer.

BRIEF DESCRIPTION OF THE DRAWINGS

These and other objects and advantages of the present invention will become more apparent from the following detailed description and accompanying drawings, in which.

DESCRIPTION OF THE PREFERRED EMBODIMENTS

Figure 1:
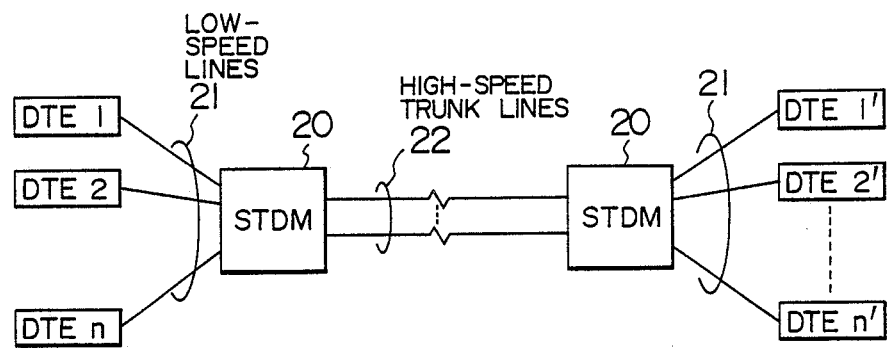
FIG. 1 is a block diagram showing the conventional multiplexer system.
Figure 2:
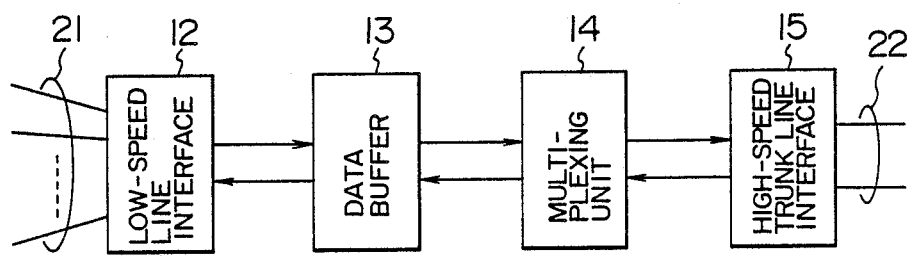
FIG. 2 is a block diagram of the STDM in FIG. 1.
Figure 3:
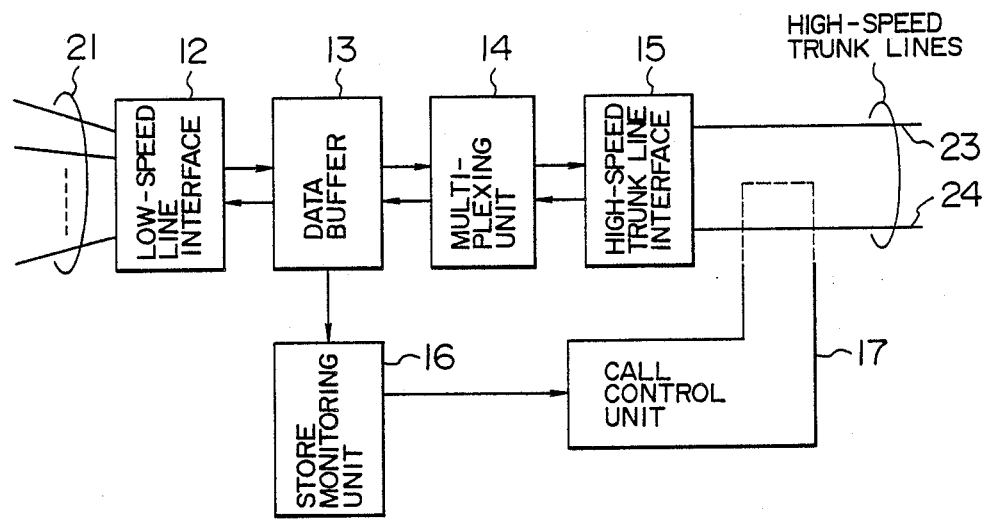
FIG. 3 is a block diagram of the STDM in the multiplexer according to an embodiment of this invention.
Figure 4:
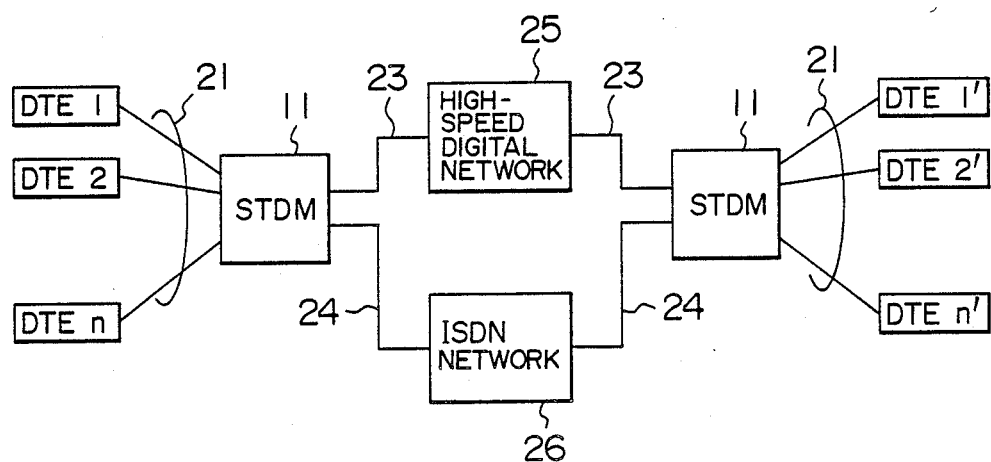
FIG. 4 is a block diagram showing an example of the system configuration which uses the STDM in FIG. 3.

FIG. 3 shows the internal blocks of STDM in the inventive multiplexer, and it is provided with a public line call function. In FIG. 3, components identical to those of FIG. 2 are given the same symbols, and these include the low-speed lines 21, low-sped line interface 12, data buffer 13, and multiplexing unit 14. The arrangement differs from that of FIG. 2 in the provision of a store quantity monitoring unit 16, call control unit 17, high-speed trunk lines 23 and 24 connected to the high-speed trunk line interface 15. In the same manner as the conventional STDM of FIG. 2, data sent over many low-speed lines 21 are stored temporarily in the data buffer 13, and thereafter sent out through the multiplexing unit 14 and high-speed trunk line interface 15 over one or more high-speed trunk lines. FIG. 4 shows, as an example, the system configuration using the STDM of FIG. 3, in which the high-speed trunk line 23 originating from the STDM 11 is connected to a high-speed digital network 25, and another high-speed trunk line 24 is connected to an integrated service digital network (ISDN) 26. The high-speed digital network 25 is permanent, fixed-priced "leased lines", while the ISDN network 26 is a toll public switching network connected upon calls from the STDM 11. Other leased lines include leased lines using D−1 lines, and other public switching networks include telephone-type public communication lines and DDX line exchange networks, for use with the system.

In the communication between the STDMs 11 in FIG. 4, the ISDN network 26 is not connected during the normal low traffic state, and communication frames between STDMs 11 are transmitted over the permanent high-speed digital network 25. At this time, the data buffer 13 in FIG. 3 has less amount of stored data. When the data rate on the low-speed lines 21 increases, the data buffer 13 has its stored data increasing, and eventually it will overflow. The store monitoring unit 16 in FIG. 3 is to prevent the buffer overflow from occurring. The unit 16 monitors the amount of data in the data buffer 13 and, if it has exceeded a certain level, the ISDN network 26 is called through the call control unit 17 so that the number of high-speed trunk lines is increased. Assuming, for example, that a high-speed digital line of 64K bits/sec is used for the high-speed trunk line and channel B (64K bits/sec) is used for the high-speed trunk line and channel B (64K bits/sec) is connected in response to a call to the ISDN network 26, the high-speed trunk circuit has its transmission ability doubled to 128K bits/sec, allowing itself to deal with high traffic (great amount of stored data) from the low-speed lines, and the overflow of the data buffer 13 can be prevented.

Figure 5:
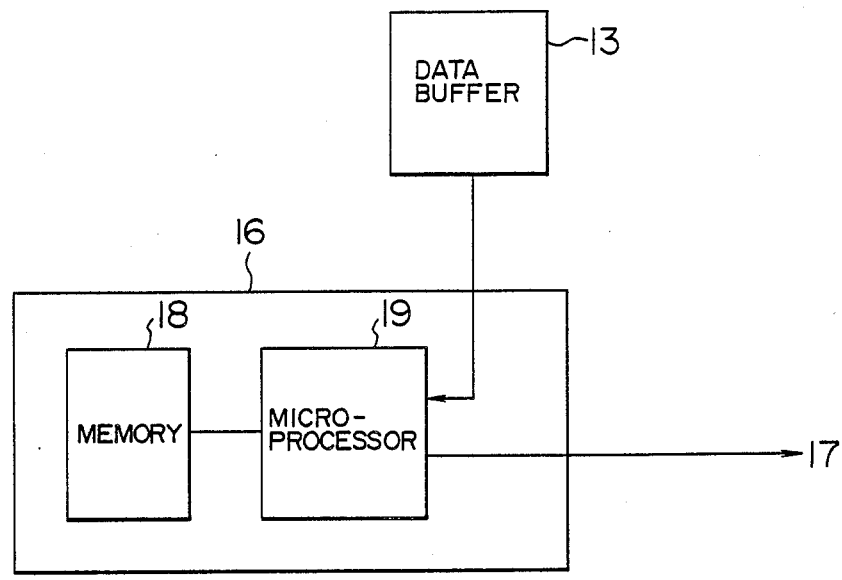
FIG. 5 is a block diagram of the data store monitoring unit in FIG. 3.
Figure 6:
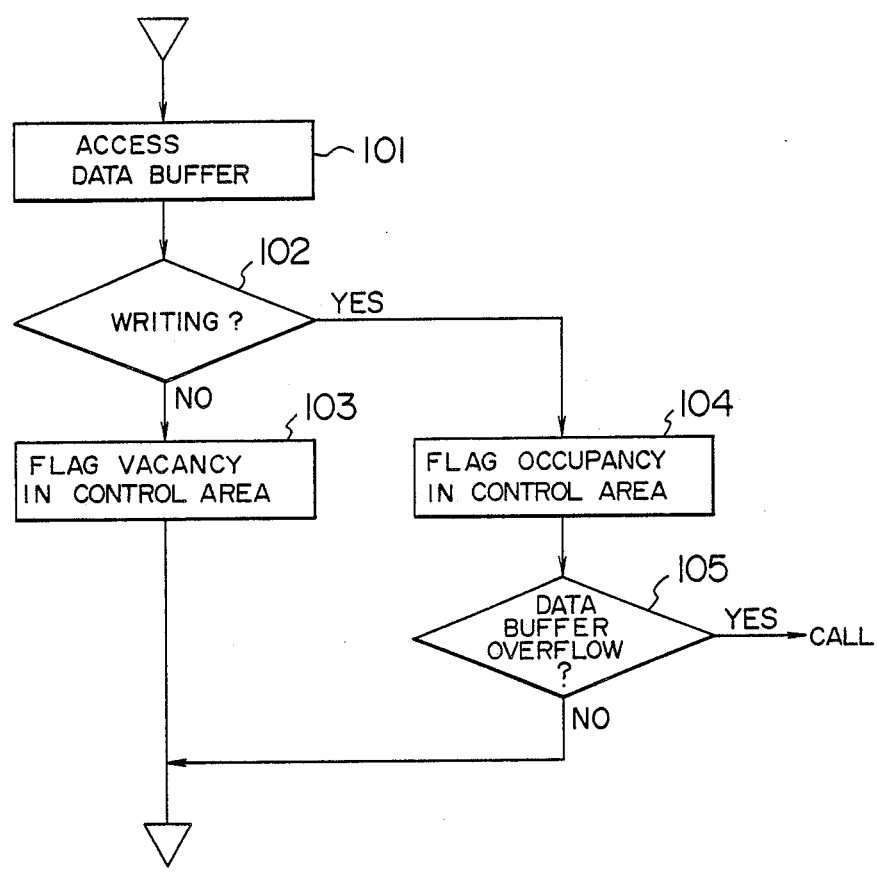
FIG. 6 is a flowchart showing the operation of the data store monitoring unit.

FIG. 5 shows the arrangement of an embodiment of the store monitoring unit 16. FIG. 6 is a flowchart showing the operation of the embodiment. In FIG. 5, the store monitoring unit 16 comprises a microprocessor unit 19 and a memory 18. The memory 18 has a control area for controlling data storage areas of the data buffer memory 13. Upon accessing the storage area of the data buffer 13 by writing or reading data from/to a low-speed line the microprocessor unit 19 is notified that the data storage area of the data buffer 13 has been accessed and that writing or reading has taken place: (step 101). The microprocessor unit 19 tests whether or not the access has resulted from writing: (step 102), and, if writing is negated, i.e., access by reading, flags the vacancy of the data storage area in the corresponding control area of the memory 18: (step 103). In case of writing, the unit 19 flags the occupancy of the area in the corresponding control area of the memory 18: (step 104), tests whether the number of occupied data storage areas exceeds a certain value: (step 105), and, in case of excess, sends a call control signal to the call control unit 17.

Figure 7:
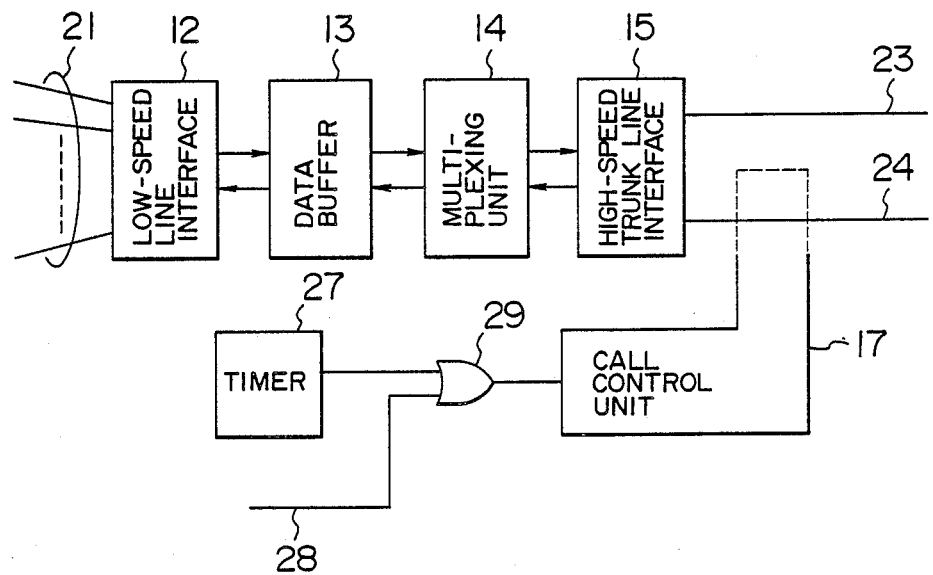
FIG. 7 is a block diagram of the STDM in the multiplexer according to another embodiment of this invention.

FIG. 7 shows another embodiment of this invention, in which a timer 27, an external control signal 28, and an OR gate 29 are provided in place of the store monitoring unit 16 in FIG. 3. If the time band of traffic congestion from low-speed lines can be predicted, the timer 27 is set to issue a call control signal at the specified time so that the call control unit 17 is operated to call the ISDN network 26. Alternatively, the ISDN network 26 may be called by an external control signal upon detection by a computer connected to the DTE, for example, that the time required for receiving an acknowledgement after having set data becomes longer than normal time due to traffic congestion, or through the manual operation by the operator who observes the excess of traffics on the monitor console.

I claim:

1. A multiplexer for trunking, over at least one high-speed trunk line on a multiplex basis under statistical time-division multiplexing control, transmission data on low-speed lines connected to a plurality of data terminal units, said statistical time-division multiplexer comprising:

a data buffer which temporarily stores data to be sent from said low-speed lines to said high-speed trunk line and data to be sent from said high-speed trunk line to said low-speed lines;

a multiplexing line interface unit which sends out data stored in said data buffer over said high-speed trunk line on a multiplex basis and converts multiplexed data received on said high-speed trunk line into data for each terminal unit and sends the converted data to said data buffer, said interface unit being normally connected with at least one leased high-speed trunk line;

a store monitoring unit which monitors the quantity of low-speed line data stored in said data buffer and generates a call control signal for calling a public line intended for multiplexed data high-speed trunking when the quantity of stored data has exceeded a predetermined level; and a call control unit connected between said store monitoring unit and said high-speed trunk line which, in response to said call control signal received from said store monitoring unit, calls said public line and connects said public line to said multiplexing line interface unit as a high-speed trunk line in addition to said leased high-speed trunk lines.

2. A multiplexer according to claim 1, wherein said public line comprises a telephone-type public communication line.

3. A multiplexer according to claim 1, wherein said public line comprises a line in an ISDN network.

4. A multiplexer for trunking, over at least one high-speed trunk line on a multiplex basis under statistical time-division multiplexing control, transmission data on low-speed lines connected to a plurality of data terminal units, said statistical time-division multiplexer comprising:

a data buffer which temporarily stores data to be sent from said low-speed lines to said high-speed trunk line and data to be sent from said high-speed trunk line to said low-speed lines;

a multiplexing line interface unit which sends out data stored in said data buffer over said high-speed trunk line on a multiplex basis and converts multiplexed data received on said high-speed trunk line into data for each terminal unit and sends the converted data to said data buffer, said interface unit being normally connected with at least one leased high-speed trunk line;

a unit which generates a call control signal for calling a public line intended for high-speed multiplexed data trunking when the quantity of store data is expected to exceed a predetermined level; and a call control unit connected between said unit which generates the call control signal and said high-speed trunk line which, in response to said call control signal received from said public line and connects said control signal, calls said public line and connects said public line to said multiplexing line interface unit as a high-speed trunk line in addition to said leased high-speed trunk lines.

5. A multiplexer according to claim 4, wherein said call control signal generating unit comprises a timer which generates a call control signal at a predetermined time.

6. A multiplexer according to claim 4, wherein said call control signal generating unit has a call control signal provided by an external unit which monitors the state of data transmission by said multiplexer.

7. A method for processing data traffic of a multiplexer which trunks, over a high-speed trunk line on a multiplex basis under statistical time-division multiplexing control, transmission data on low-speed lines connected to a plurality of data terminal units, said method comprising the steps of:

monitoring the quantity of low-speed line data in a buffer which temporarily stores data to be sent from said low-speed lines to said high-speed trunk line and data to be sent from said high-speed trunk line to said low-speed lines; and connecting a public line as a high-speed multiplex trunk line in addition to leased high-speed trunk lines when the quantity of the stored data has exceeded a predetermined level.

8. A method for processing data traffic of a multiplexer which trunks, over a high-speed trunk line on a multiplex basis under statistical time-division multiplexing control, transmission data on low-speed lines connected to a plurality of data terminal units, said method comprising the steps of:

predicting that the quantity of data traffic on said high-speed trunk line will exceed a predetermined level; and connecting a public line as at least one highspeed multiplex trunk line in addition to leased high-speed trunk lines if the predicted condition is met.

9. A method for processing data traffic according to claim 8, wherein said prediction is implemented with a timer.

10. A method for processing data traffic according to claim 8, wherein said prediction is implemented with an external unit which monitors the state of data transmission by said multiplexer.

* * * * *

UNITED STATES PATENT AND TRADEMARK OFFICE
CERTIFICATE OF CORRECTION

PATENT NO. : 4,899,337

DATED : February 6, 1990

INVENTOR(S) : Masato Hirai

It is certified that error appears in the above-identified patent and that said Letters Patent is hereby corrected as shown below:

Claim 4, column 5, lines 43-44, delete "public line and connects said" and insert therefor --unit which generates the call--.

Signed and Sealed this

Fourth Day of December, 1990

Attest:

HARRY F. MANBECK, JR.

Attesting Officer

Commissioner of Patents and Trademarks